US010608790B2

(12) United States Patent
Nammi

(10) Patent No.: US 10,608,790 B2
(45) Date of Patent: Mar. 31, 2020

(54) DATA TRANSMISSION WITH CODE BLOCK SEGMENTATION FOR 5G SYSTEMS

(71) Applicant: AT&T INTELLECTUAL PROPERTY I, L.P., Atlanta, GA (US)

(72) Inventor: SaiRamesh Nammi, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 113 days.

(21) Appl. No.: 15/586,839

(22) Filed: May 4, 2017

(65) Prior Publication Data

US 2018/0323906 A1    Nov. 8, 2018

(51) Int. Cl.
*H04L 1/08*     (2006.01)
*H04L 1/18*     (2006.01)
*H04L 1/00*     (2006.01)

(52) U.S. Cl.
CPC .............. *H04L 1/08* (2013.01); *H04L 1/189* (2013.01); *H04L 1/0061* (2013.01)

(58) Field of Classification Search
CPC .......... H04L 1/08; H04L 1/0061; H04L 1/189
See application file for complete search history.

(56) References Cited

U.S. PATENT DOCUMENTS

| 8,327,234 | B2 | 12/2012 | Earnshaw et al. | |
|---|---|---|---|---|
| 8,634,366 | B2 | 1/2014 | Kim et al. | |
| 8,793,562 | B2 | 7/2014 | Kim et al. | |
| 8,958,309 | B2 | 2/2015 | Kim | |
| 9,143,284 | B2 | 9/2015 | Mikami | |
| 9,225,470 | B2 | 12/2015 | Kim et al. | |
| 9,509,452 | B2 | 11/2016 | Liang et al. | |
| 9,590,765 | B2 | 3/2017 | Pi et al. | |
| 2009/0106635 | A1* | 4/2009 | Kim ...................... | H04L 1/1845 714/799 |
| 2009/0313516 | A1* | 12/2009 | Shin ...................... | H04L 1/0003 714/748 |
| 2011/0044180 | A1* | 2/2011 | Kim ...................... | H04L 1/0026 370/242 |
| 2012/0327761 | A1 | 12/2012 | Obuchi et al. | |
| 2014/0092784 | A1* | 4/2014 | Khayrallah ........... | H04L 1/1887 370/280 |

(Continued)

OTHER PUBLICATIONS

Xue et al., "Block Segmentation Hybrid ARQ for 802.16m",2008, IEEE, 5 pages.

*Primary Examiner* — Cynthia Britt
*Assistant Examiner* — Rong Tang
(74) *Attorney, Agent, or Firm* — Amin, Turocy & Watson, LLP

(57) ABSTRACT

Various embodiments disclosed herein provide for a transmission system using codeblock segmentation that does not have to retransmit each of the codeblock segments if one of the codeblock segments is determined to have an error at the receiver. The transmitter segments a transport block into a group of codeblock segments, each having respective cyclic redundancy check bits. The receiver receives the group of codeblock segments, and during decoding, if it is determined that one of the segments have an error, instead of just sending back to the transmitter a negative acknowledgement (NAK) the receiver can send back a NAK as well as an indicator of which segment was in error. The transmitter can then resend just the segment in error in order to improve efficiency and decrease power requirements.

20 Claims, 10 Drawing Sheets

(56) References Cited

U.S. PATENT DOCUMENTS

2016/0173232 A1 6/2016 Mallik et al.
2016/0226643 A1 8/2016 Mallik et al.
2016/0285589 A1 9/2016 Mukkavilli et al.
2017/0026297 A1 1/2017 Sun et al.

* cited by examiner

DATA TRANSMISSION WITH CODE BLOCK SEGMENTATION FOR 5G SYSTEMS

TECHNICAL FIELD

The present application relates generally to the field of mobile communication and, more specifically, to retransmitting codeblocks that have been segmented in a next generation wireless communications network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
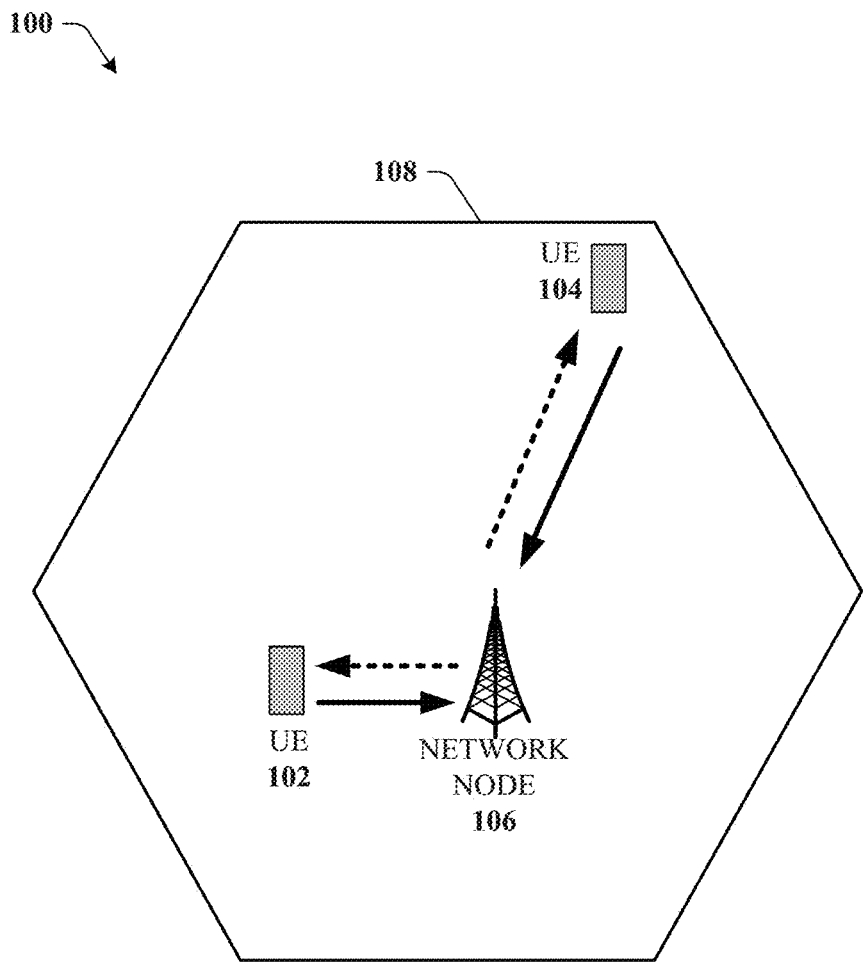
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

In various embodiments, a base station device can comprise a processor and a memory that stores executable instructions that, when executed by the processor facilitate performance of operations. The operations can comprise segmenting a transport block into a group of codeblock segments. The operations can also comprise transmitting the group of codeblock segments to a receiver device. The operations can also comprise receiving from the receiver device first information indicating that a codeblock segment of the group of codeblock segments received by the receiver device is in error, and second information indicating an identity of the codeblock segment of the group of codeblock segments that was in error. The operations can also comprise retransmitting the codeblock segment to the receiver device.

In another embodiment, method comprises determining, by a mobile device comprising a processor, that a transmission comprising a group of codeblock segments comprises a codeblock segment that has an error. The method can also comprise transmitting, by the mobile device, a negative acknowledgement and a codeblock segment identifier indicating the codeblock segment that has the error to a base station device. The method can also comprise receiving, by the mobile device, a retransmission of the codeblock segment.

In another embodiment machine-readable storage medium, comprising executable instructions that, when executed by a processor of a device, facilitate performance of operations. The operations can comprise determining that a transmission comprising a group of codeblock segments comprises a codeblock segment that has an error. The operations can also comprise transmitting a negative acknowledgement and a codeblock segment identifier indicating the codeblock segment that has the error to a base station device. The operations can also comprise receiving a retransmission of the codeblock segment via repetition coding.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Various embodiments disclosed herein provide for a transmission system using codeblock segmentation that does not have to retransmit each of the codeblock segments if one of the codeblock segments is determined to have an error at the receiver. The transmitter segments a transport block into a group of codeblock segments, each having respective cyclic redundancy check (CRC) bits. The receiver receives the group of codeblock segments, and during decoding, if it is determined that one of the segments have an error, instead of just sending back to the transmitter a negative acknowledgement (NAK) the receiver can send back a NAK as well as an indicator of which segment was in error. The transmitter can then resend just the segment in error in order to improve efficiency and decrease power requirements.

In an embodiment, the transmitter can use repetition coding to resend the codeblock segment indicated. Using repetition coding, the codeblock segment is duplicated where the number of copies is one less than the original number of segments. The codeblock segment duplicates can be sent at a greatly reduced power, and the receiver can select the codeblock segment that recurs the most frequently of the duplicates.

In an embodiment, the receiver can use two different ways to signal to the transmitter which codeblock segment is in error. In the first, explicit embodiment, the receiver indicates HARQ-ACK, OCBS (indication of the codeblock segment) presence (1 bit) if there is only one codeblock is in error and the index of the codeblock segment which is in error, where 3 bits can be used to indicate which codeblock segment is in error. In the second embodiment, the receiver can implicitly indicate, by combining the HARQ-ACK/NAK and the OCBS into a single codeword.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

Figure 2:
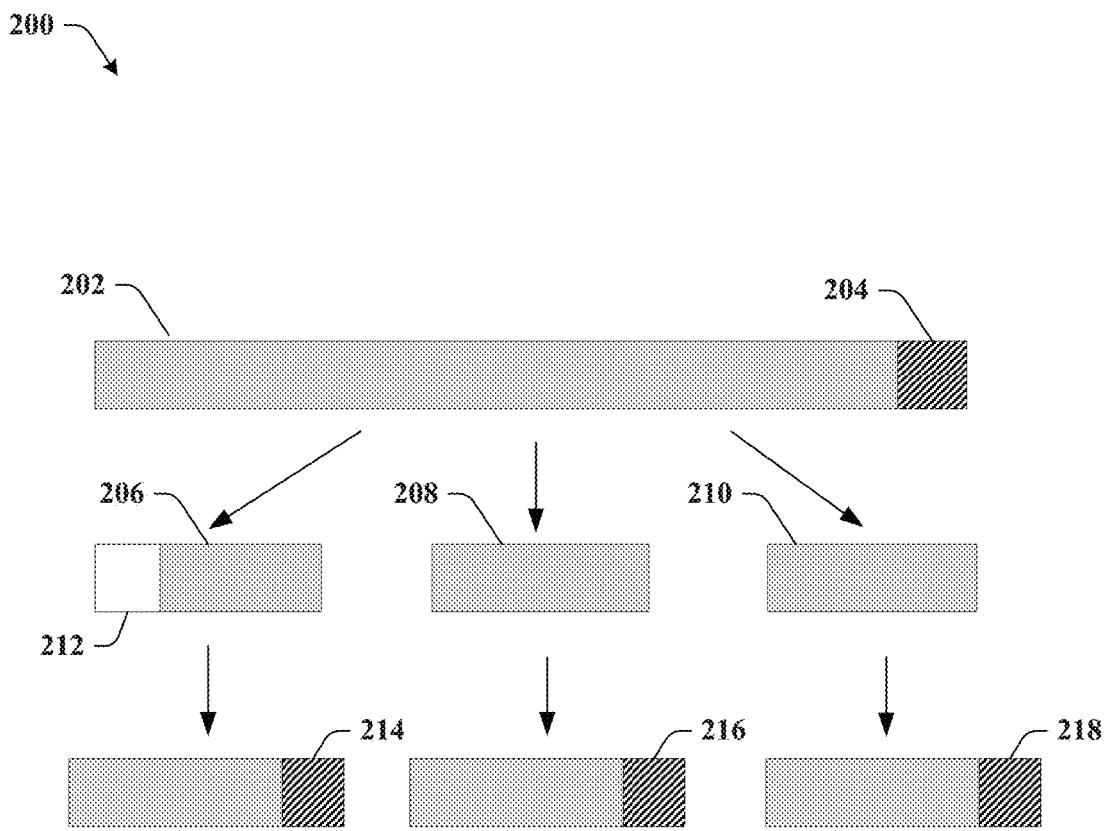
FIG. 2 illustrates an example block diagram showing codeblock segmentation in accordance with various aspects and embodiments of the subject disclosure.

Turning now to FIG. 2, illustrated is an example block diagram 200 showing codeblock segmentation in accordance with various aspects and embodiments of the subject disclosure.

In 5G systems or NR (New Radio) for data transmission, a transport block 202 can be encoded using a low density parity check (LDPC) code. In the first step of the physical-layer processing, an M-bit CRC 204 is calculated for and appended to each transport block. The CRC 204 allows for receiver-side detection of errors in the decoded transport block. The corresponding error indication can, for example, be used by the downlink hybrid-ARQ protocol as a trigger for requesting retransmissions. If the transport block 202, including the transport-block CRC 204, exceeds the maximum code-block size of 8192 bits, code-block segmentation is applied before the LDPC coding. Code-block segmentation means that the transport block is segmented into smaller code blocks (e.g., code blocks 206, 208, and 210), the sizes of which should match the set of code-block sizes supported by the LDPC coder. In order to ensure that a transport block of arbitrary size can be segmented into code blocks that match the set of available code-block sizes, the specification includes the possibility to insert "dummy" filler bits 212 at the head of the first code block 206.

In an embodiment, the transmitter can then add CRC bits 214, 216, and 218 to each of the codeblock segments 206, 208, and 210 so that a receiver can determine whether any of the individual codeblock segments have been corrupted during transmission. For instance, if codeblock segment 206 is corrupted, when the receiver performs a parity check on CRC bits 214, the receiver can determine that the codeblock segment 206 contains an error, and the receiver can request a retransmission.

In an embodiment, the UE 102 and the UE 104 may be moving at various speeds and velocities relative to the network node 106. At increased rates of movement, and depending on the distance of the UE from the network node 106, there can be errors in transmission that can be addressed using hybrid automatic repeat request (HARQ) among other techniques. HARQ is a combination of high-rate forward error-correcting coding and ARQ error-control. In standard ARQ, redundant bits are added to data to be transmitted using an error-detecting (ED) code such as a cyclic redundancy check (CRC). Receivers detecting a corrupted message will request a new message from the sender.

In traditional methods, the transmitter would resend each of the codeblock segments if a NAK is received. In the embodiment disclosed herein, the transmitter merely retransmits only the codeblock segment that has an error. With codeblock segmentation, there can be a significant probability that only one codeblock segment is in error for medium to high speed UEs.

In the embodiments disclosed herein however, the UE can send an indication of which codeblock segment has an error, and so the transmitter will only resend that particular codeblock segment.

Figure 3A:
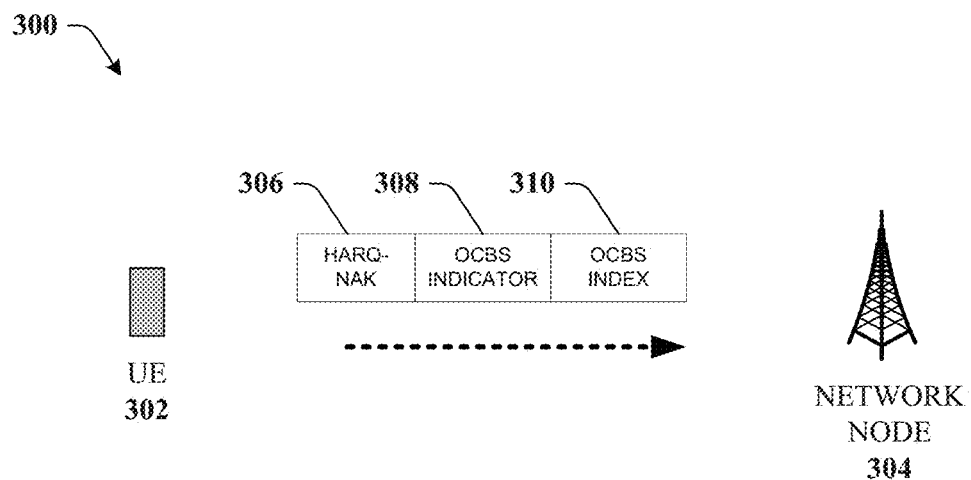
FIGS. 3A and 3B illustrate example block diagrams showing retransmission requests and codewords in accordance with various aspects and embodiments of the subject disclosure.
Figure 3B:
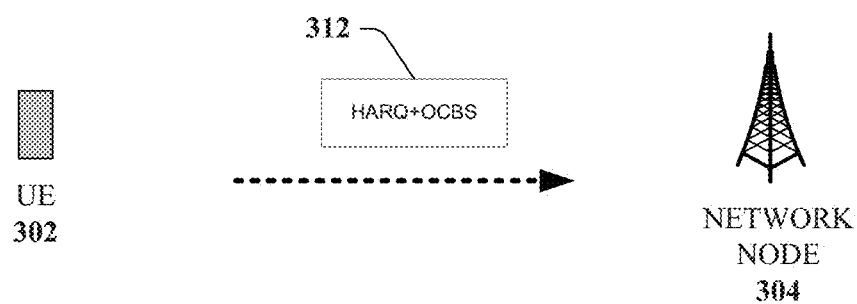

Turning now to FIGS. 3A and 3B, illustrated are example block diagrams 300 showing retransmission requests and codewords in accordance with various aspects and embodiments of the subject disclosure.

In the embodiment shown in FIG. 3A, a UE 302 can receive a transmission comprising a group of codeblock segments from network node 304. The UE 302 can check the CRC bits appended to each of the codeblock segments to determine whether or not the codeblock segments are in error, or have been corrupted during transmission. If the UE 302 determines that one or more of the codeblock segments is in error, the UE 302 can send a transmission comprising 3 codewords on an uplink control channel that comprises information about whether there is an error (HARQ-NAK) 306, an indicator 308 that one bit is in error (OCBS Indicator), and an OCBS index 310 that identifies which segment is in error.

As an example, if the maximum number of codeblock segments possible is 8, then 3 bits can be used to indicate the codeblock in which the error is present as shown below in Table 1:

| OCBS INDEX | Codeblock segment which is in error |
|---|---|
| 001 | 1 |
| 010 | 2 |
| 011 | 3 |
| 100 | 4 |
| 101 | 5 |
| 110 | 6 |
| 111 | 7 |
| 000 | 8 |

By contrast, in other embodiments where there can be fewer or more codeblock segments, different numbers of bits can be used to identify the positions.

In the embodiment, shown in FIG. 3B, UE 302 can receive a transmission comprising a group of codeblock segments from network node 304. The UE 302 can check the CRC bits appended to each of the codeblock segments to determine whether or not the codeblock segments are in error, or have been corrupted during transmission. If the UE 302 determines that one or more of the codeblock segments is in error, the UE 302 can send a transmission on an uplink control channel that comprises information about whether there is an error and in a single codeword 312 that can be used to indicate whether an codeblock segment has an error, and which segment is in error.

As an example, the HARQ ACK/NAK and OCBS INDEX can be combined into a single codeword and transmitted back to the network node 304 as shown in Table 2:

| HARQ-ACK/NAK | Interpretation |
|---|---|
| 000 | ACK |
| 111 | NAK without OCBS |
| 011 | NAK with OCBS = 1 |
| 100 | NAK with OCBS = 2 |
| 101 | NAK with OCBS = 3 |
| 110 | NAK with OCBS = 4 |
| 001 | NAK with OCBS = 5 |

Figure 4:
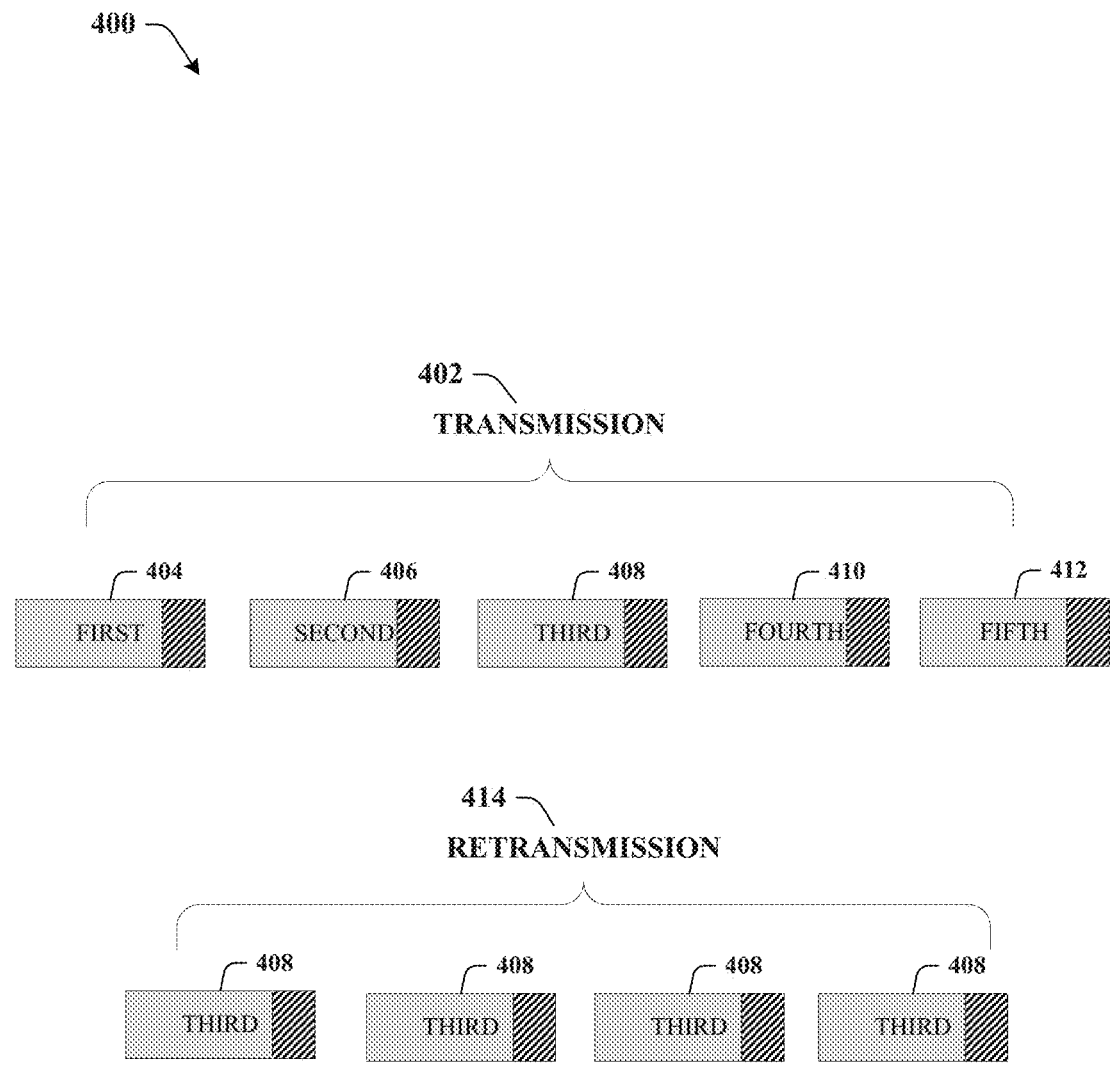
FIG. 4 illustrates an example block diagram showing repetition coding in accordance with various aspects and embodiments of the subject disclosure.

Based on the information sent by the UE 302 to the network node 304, the network node 304 can retransmit the codeblock segments which are in error. In an embodiment, the network node 304 can resend just the single codeblock segment, or can use repetition coding to resend a set of duplicates of the codeblock segment. An example of this can be seen in FIG. 4, where an example block diagram 400 showing repetition coding in accordance with various aspects and embodiments of the subject disclosure is illustrated.

In coding theory, the repetition code is a basic error-correcting code. In order to transmit a message over a noisy channel that may corrupt the transmission in a few places, the idea of the repetition code is to just repeat the message several times. The hope is that the channel corrupts only a minority of these repetitions. This way the receiver will notice that a transmission error occurred since the received data stream is not the repetition of a single message, and moreover, the receiver can recover the original message by looking at the received message in the data stream that occurs most often.

If a first transmission 402 comprises a first, second, third, fourth and fifth codeblock segments (404, 406, 408, 410, and 412), and a UE determines that third segment 408 contains an error, the network node can send a retransmission 414 comprising just the third segment 408. In an embodiment, the network node will send 4 duplicate copies of the third segment 408. More generally, the network node sends, a number of duplicates that is one less than the original number of segments. Even if one or two of the duplicate copies are sent and have errors, the UE can still correctly determine what the codeblock segment should be by using the duplicate that occurs most often, or is the mode. In this way also, the power required to transmit the retransmission 414 can also be reduced. In some embodiments, the power reduction over the original transmission can be proportional, or based on, the number of duplicate copies of the codeblock segment retransmitted.

It is also to be appreciated that while the embodiments described herein have been described in relation to codeblock segmentation from the network node/base station to the UE, the same principles can also be applied to uplink codeblock segmentation and side link systems. Similarly, note that for simplicity we use the radio network node or simply network node is used for gNB. It refers to any type of network node that serves UE and/or connected to other network node or network element or any radio node from where UE receives signal. Examples of radio network nodes are Node B, base station (BS), multi-standard radio (MSR) node such as MSR BS, gNB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Figure 5:
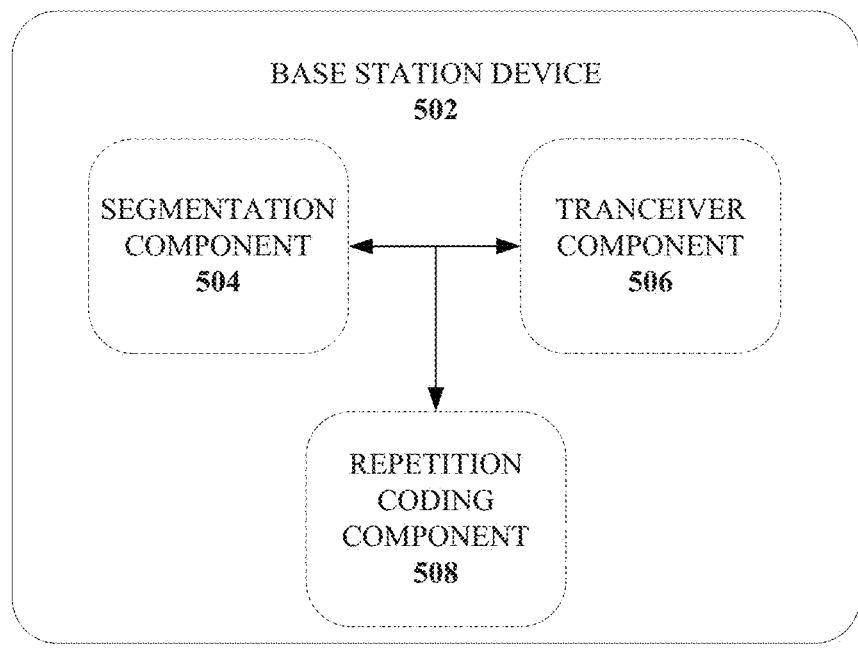
FIG. 5 illustrates an example block diagram of a base station device in accordance with various aspects and embodiments of the subject disclosure.

Likewise, for reception we use the term user equipment (UE). It refers to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports are also interchangeably used but carry the same meaning in this disclosure Turning now to FIG. 5, illustrated is a block diagram 500 of a base station device 502 according to various embodiments disclosed herein.

The base station device 502 can include a segmentation component 504 that segments a transport block into a group of codeblock segments that each have respective cyclic redundancy check bits. Since each of the codeblock segments can include respective cyclic redundancy check bits, a receiver can perform parity checks on each of the codeblock segments in order to determine whether any particular codeblock segments have errors.

The base station device 502 can also include a transceiver component 506 that transmitting the group of codeblock segments to a receiver device. The transceiver component 506 can also receive from the receiver device first information indicating that one of the group of codeblock segments received by the receiver device is in error, and second information indicating an identity of a codeblock segment of the group of codeblock segments that was in error.

In an embodiment, the first information can be a single codeword comprising both the HARQ-ACK/NAK and the codeblock segment index, and in other embodiments, can be two or more codewords with the HARQ and codeblock segment both explicitly indicated.

The repetition coding component 508 can prepare a retransmission that retransmits the codeblock segment comprising the error back to the receiver device. In an embodiment, the repetition coding component 508 can use repetition coding that comprises retransmitting the codeblock segment a first number of times that is one less than a second number of codeblock segments. In an embodiment, the repetition coding can ensure that the first power of the retransmitting the codeblock segment is smaller than a second power of transmitting the group of codeblock segments.

Figure 6:
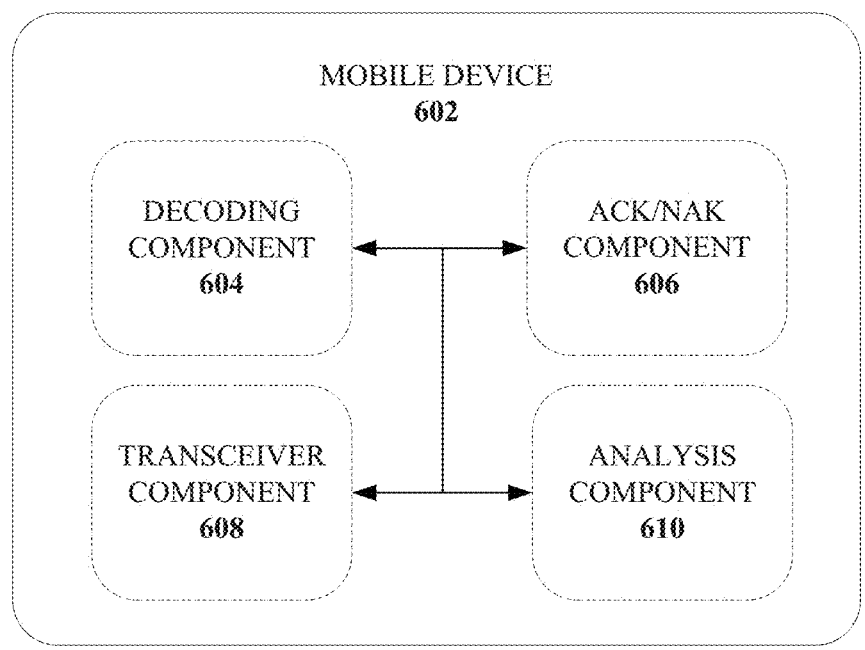
FIG. 6 illustrates an example block diagram of a mobile device in accordance with various aspects and embodiments of the subject disclosure.

Turning now to FIG. 6, illustrated is an example block diagram 600 of a mobile device 602 in accordance with various aspects and embodiments of the subject disclosure.

A mobile device 602 can include a decoding component 604 that determining whether a transmission received by transceiver component 608 comprises a group of codeblock segments that has a codeblock segment that has an error. The decoding component 604 can accomplish this by decoding cyclic redundancy check bits that are appended to each of the codeblock segments. If the CRC bits cannot be decoded, then it is indicative that the codeblock is in error, due to low signal to noise ratio, and/or interference between the transmitter and the mobile device.

The ACK/NAK component 606 can prepare one or more codewords to send back to the transmitter indicating the error. In an embodiment, the ACK/NAK component 606 can prepare a transmission comprising 3 codewords on an uplink control channel that comprises information about whether there is an error (HARQ-NAK), an indicator that one bit is in error (OCBS Indicator), and an OCBS index that identifies which segment is in error (e.g., Table 1). In another embodiment, the ACK/NAK component 606 can prepare single codeword that can be used to indicate whether an codeblock segment has an error, and which segment is in error (e.g., Table 2). The transceiver 608 can then send the one or more codewords indicating the error or lack of error back to the transmitter device on an uplink control channel.

In response to receiving the repetition coded duplicates, the analysis component 610 can determine which of the duplicates recurs most frequently, and select that version of the codeblock segment to replace the codeblock segment in error.

Figure 7:
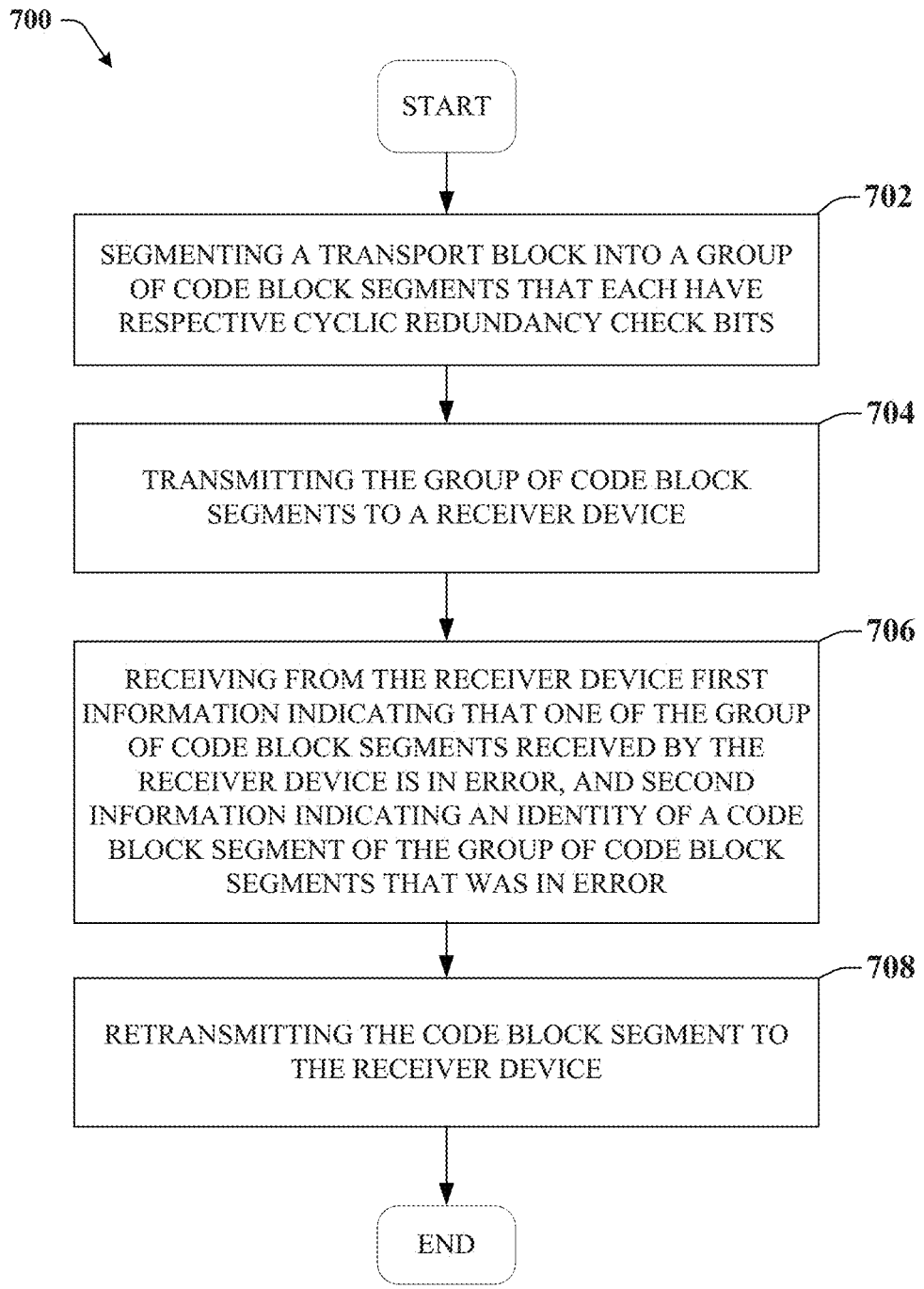
FIG. 7 illustrates an example method for retransmitting a codeblock in accordance with various aspects and embodiments of the subject disclosure.
Figure 8:
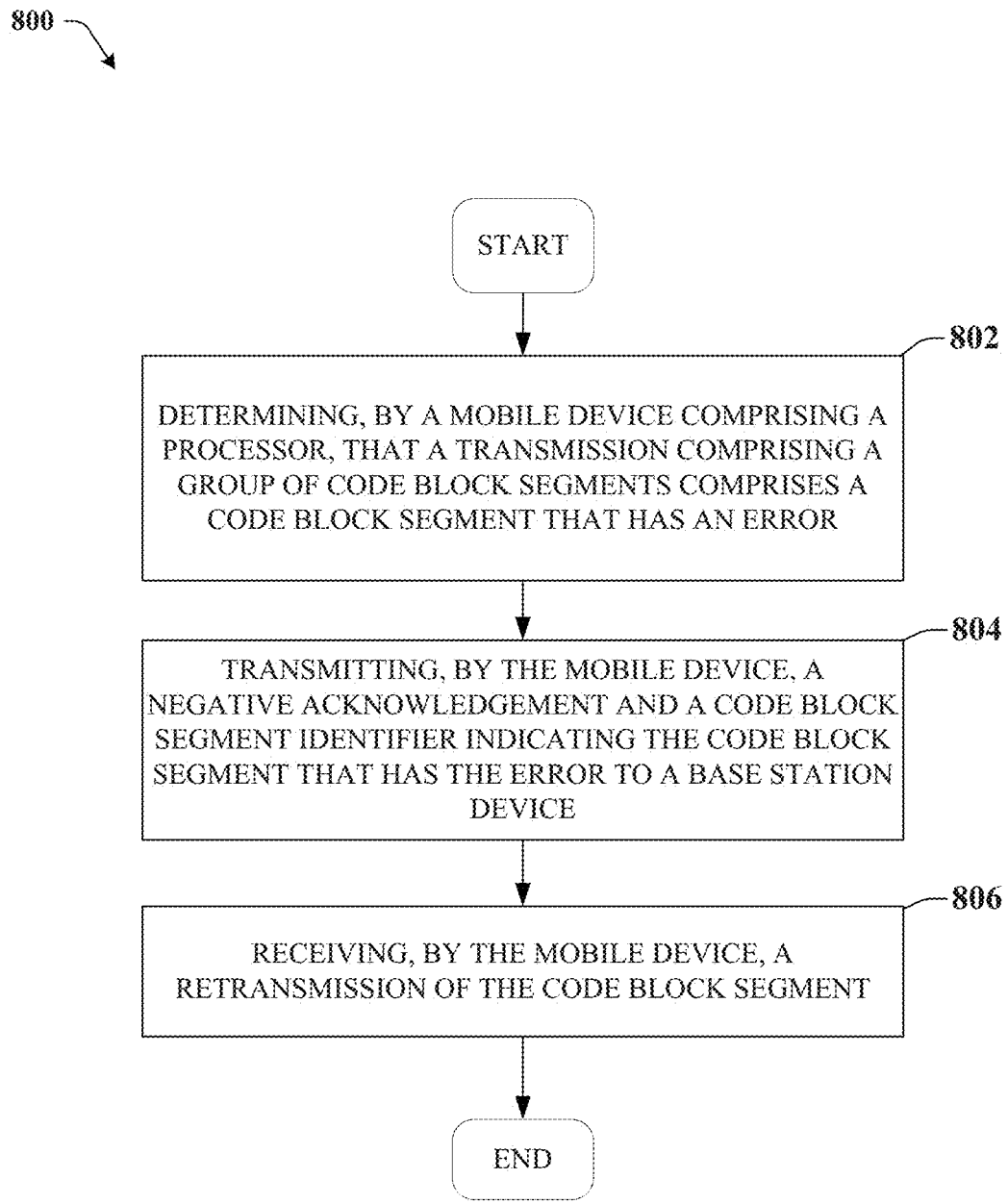
FIG. 8 illustrates an example method for requesting retransmission of a codeblock in accordance with various aspects and embodiments of the subject disclosure.

FIGS. 7-8 illustrates a process in connection with the aforementioned systems. The process in FIGS. 7-8 can be implemented for example by the systems in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates an example method 700 for retransmitting a codeblock in accordance with various aspects and embodiments of the subject disclosure Method 700 can begin at 702 wherein the method includes segmenting a transport block into a group of codeblock segments that each have respective cyclic redundancy check bits.

At 704, the method can include transmitting the group of codeblock segments to a receiver device.

At 706, the method can include receiving from the receiver device first information indicating that one of the group of codeblock segments received by the receiver device is in error, and second information indicating an identity of a codeblock segment of the group of codeblock segments that was in error.

At 708, the method can include retransmitting the codeblock segment to the receiver device.

FIG. 8 illustrates an example method 800 for requesting retransmission of a codeblock in accordance with various aspects and embodiments of the subject disclosure.

At 802, the method can include determining, by a mobile device comprising a processor, that a transmission comprising a group of codeblock segments comprises a codeblock segment that has an error.

At 804, the method can include transmitting a negative acknowledgement and a codeblock segment identifier indicating the codeblock segment that has the error to a base station device.

At 808, the method can include receiving a retransmission of the codeblock segment.

Figure 9:
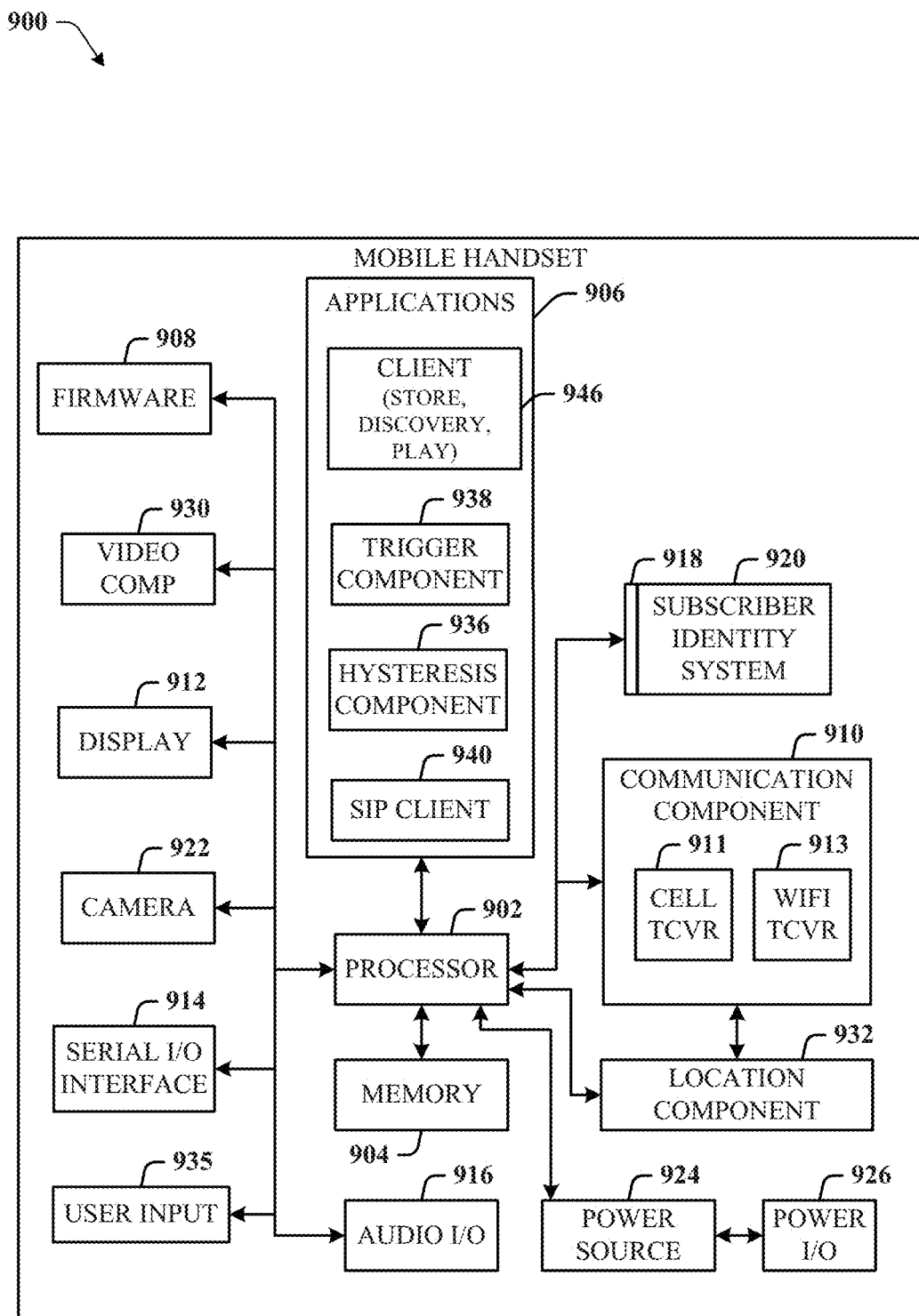
FIG. 9 illustrates an example block diagram of an example user equipment that can be a mobile handset operable to provide a format indicator in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and trouble-shooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
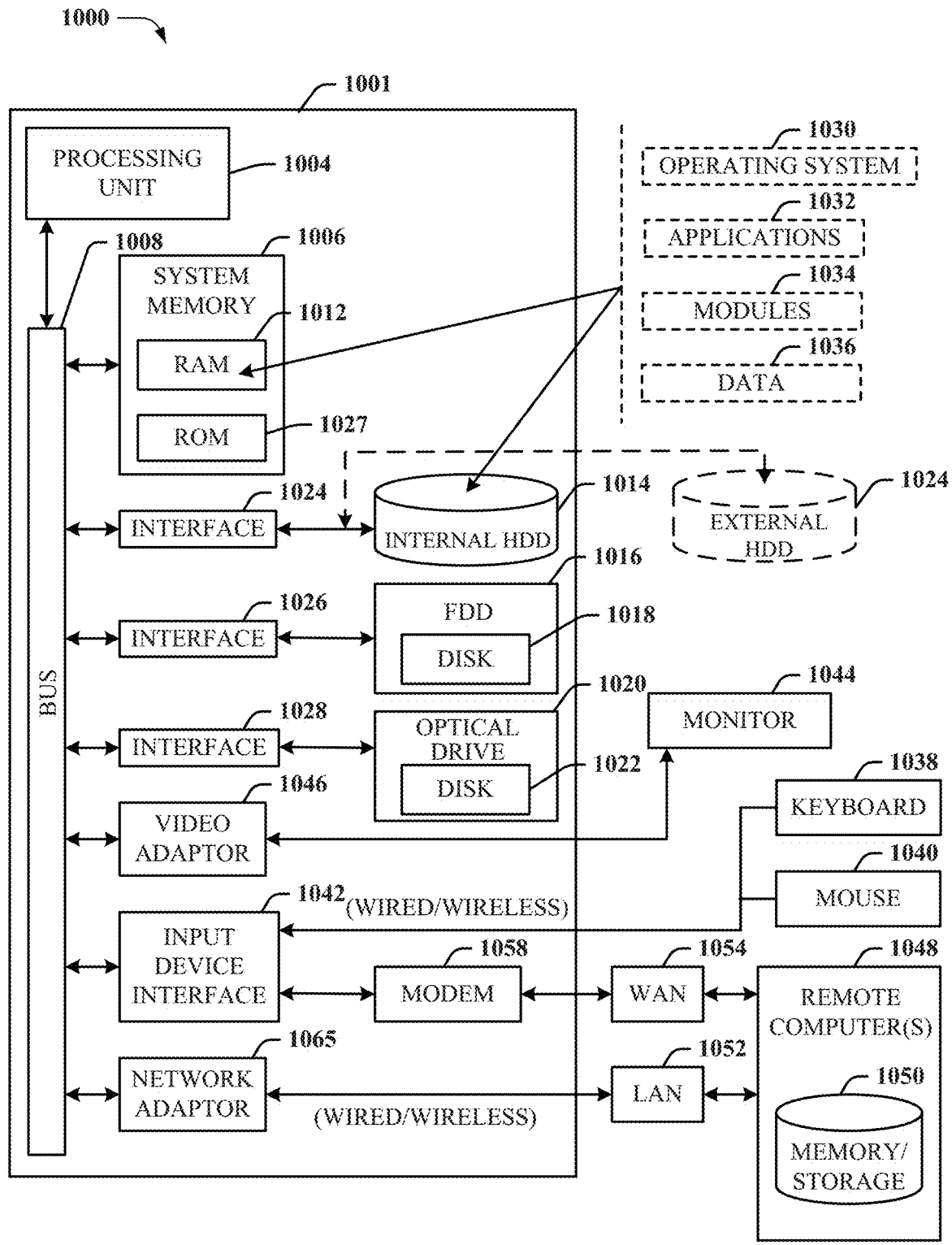
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 406) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk;

magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A base station device, comprising:
   a processor; and
   a memory that stores executable instructions that, when executed by the processor, facilitate performance of operations, comprising:
   segmenting a transport block into a group of codeblock segments, wherein codeblock segments in the group of codeblock segments are assigned respective codeblock segment index numbers identifying positions of the codeblock segments in the group of codeblock segments;
   transmitting the group of codeblock segments to a receiver device;
   receiving from the receiver device first information indicating that a codeblock segment of the group of codeblock segments received by the receiver device is in error, and second information comprising a codeblock segment index number of the codeblock segment of the group of codeblock segments that was in error; and
   retransmitting the codeblock segment that was in error to the receiver device using a repetition coding, the retransmitting comprising retransmitting the codeblock segment a first number of times that is one less than a second number of codeblock segments in the group of codeblock segments.

2. The base station device of claim 1, wherein a first power of the retransmitting the codeblock segment is smaller than a second power of transmitting the group of codeblock segments.

3. The base station device of claim 2, wherein a power reduction of the first power of the retransmitting of the codeblock segment over the second power of the transmitting of the group of codeblock segments is based on the second number of codeblock segments in the group of codeblock segments.

4. The base station device of claim 1, wherein the first information is received in a first codeword, and the second information is received in a second codeword separate from the first codeword.

5. The base station device of claim 1, wherein the first information and the second information are received in a first codeword.

6. The base station device of claim 1, wherein the first information is a negative acknowledgement.

7. A method, comprising:
   determining, by a mobile device comprising a processor, that a transmission comprising a group of codeblock segments comprises a codeblock segment that has an error, wherein codeblock segments in the group of codeblock segments are assigned respective codeblock segment index numbers identifying positions of the codeblock segments in the group of codeblock segments;
   transmitting, by the mobile device, a negative acknowledgement and a codeblock segment index number of the codeblock segment that has the error to a base station device; and
   receiving, by the mobile device, a retransmission of the codeblock segment via repetition coding that comprises retransmissions of the codeblock segment a first number of times that is one less than a second number of codeblock segments in the group of codeblock segments.

8. The method of claim 7, further comprising transmitting, by the mobile device, the negative acknowledgement and the codeblock segment index number in a single codeword.

9. The method of claim 7, further comprising transmitting, by the mobile device, the negative acknowledgement and the codeblock segment index number in different codewords.

10. The method of claim 7, wherein the determining that the transmission comprising the group of codeblock segments comprises the codeblock segment that has the error comprises decoding respective groups of cyclic redundancy check bits associated with each codeblock segment of the group of codeblock segments.

11. The method of claim 7, wherein a first power of the retransmission of the codeblock segment is smaller than a second power of transmission of the group of codeblock segments.

12. The method of claim 11, further comprising:
determining, by the mobile device, a codeblock segment duplicate that is a mode of the duplicates; and
selecting, by the mobile device, the codeblock segment duplicate to replace the codeblock segment that has an error.

13. The method of claim 7, wherein the transmitting the negative acknowledgement and the codeblock segment index number comprises transmitting in an uplink control channel.

14. The method of claim 7, further comprising:
receiving, by the mobile device via a downlink control channel, an indication that the base station device has repeated the codeblock segment.

15. A non-transitory machine-readable storage medium, comprising executable instructions that, when executed by a processor of a device, facilitate performance of operations, comprising:
determining that a transmission comprising a group of codeblock segments comprises a codeblock segment that has an error, wherein codeblock segments in the group of codeblock segments are assigned respective codeblock segment index numbers identifying positions of the codeblock segments in the group of codeblock segments;
transmitting a negative acknowledgement and a codeblock segment index number of the codeblock segment that has the error to a base station device; and
receiving a retransmission of the codeblock segment via repetition coding that comprises retransmissions of the codeblock segment a first number of times that is one less than a second number of codeblock segments in the group of codeblock segments.

16. The non-transitory machine-readable storage medium of claim 15, wherein the determining that the transmission comprising the group of codeblock segments comprises the codeblock segment that has the error comprises decoding respective groups of cyclic redundancy check bits associated with respective ones of the group of codeblock segments.

17. The non-transitory machine-readable storage medium of claim 15, wherein the operations further comprise:
determining a codeblock segment duplicate that is a mode of retransmitted codeblock segments; and
selecting the codeblock segment duplicate to replace the codeblock segment that has an error.

18. The non-transitory machine-readable storage medium of claim 15, wherein the operations further comprise:
receiving, via a downlink control channel, an indication that the base station device has repeated the codeblock segment.

19. The non-transitory machine-readable storage medium of claim 15, wherein a first power of the retransmission of the codeblock segment is smaller than a second power of transmission of the group of codeblock segments.

20. The non-transitory machine-readable storage medium of claim 19, wherein a power reduction of the first power of the retransmission of the codeblock segment over the second power of the transmission of the group of codeblock segments is based on the second number of codeblock segments in the group of codeblock segments.

* * * * *